US006539151B2

(12) United States Patent
Fajardo et al.

(10) Patent No.: US 6,539,151 B2
(45) Date of Patent: Mar. 25, 2003

(54) METHOD FOR MAKING SEPARABLE MULTIPLE CORE OPTICAL FIBERS, THE RESULTING FIBER STRUCTURES, AND USES THEREOF

(75) Inventors: James C. Fajardo, Painted Post, NY (US); Michael T. Gallagher, Corning, NY (US); Michael J. Hackert, Corning, NY (US); Daniel W. Hawtof, Painted Post, NY (US); George E. Berkey, Pine City, NY (US); Daniel A. Nolan, Corning, NY (US); Selina G. Farwell, Southapmtom (GB); Peter G. Wigley, Corning, NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/741,887

(22) Filed: Dec. 22, 2000

(65) Prior Publication Data

US 2003/0031434 A1 Feb. 13, 2003

(Under 37 CFR 1.47)

Related U.S. Application Data

(60) Provisional application No. 60/226,747, filed on Aug. 21, 2000.

(51) Int. Cl.$^7$ .............................. G02B 6/04; G02B 6/44
(52) U.S. Cl. ....................................... 385/114; 385/100
(58) Field of Search ................. 385/100–121; 65/385, 388–390, 401, 403, 406, 408–412, 427, 430–433, 435, 475, 477, 480

(56) References Cited

U.S. PATENT DOCUMENTS

| 4,046,537 | A | 9/1977 | Deserno et al. ................. 65/2 |
| 4,129,356 | A | 12/1978 | Oestreich ................. 350/96.23 |
| 4,166,670 | A | * | 9/1979 | Ramsay ...................... 385/113 |

(List continued on next page.)

FOREIGN PATENT DOCUMENTS

| EP | 0 703 475 A1 | 3/1996 |
| EP | 0 806 688 A1 | 11/1997 |
| JP | 03-100609 | 4/1991 |
| JP | 2000-206382 | 7/2000 |
| JP | 2000-206382 A | * 7/2000 | ............ G02B/6/44 |
| WO | WO 99/05550 | 2/1999 |

OTHER PUBLICATIONS

Bethuys, S. et al., 1×4 fused multicore singlemode febre coupler: theory, fabrication and analysis, Electronic Letters, vol. 34, Nov. 15 (Apr. 20, 1998), pp. 1250–1252.
Bethuys, S. et al., "Optical add/drop multiplexer based on UV–written Bragg gratings in twincore fibre Mach–Zehnder Interferometer", Electronic Letters, vol. 34, Nov. 15 (Apr. 23, 1998), pp. 1516–1517.

*Primary Examiner*—Akm E. Ullah
*Assistant Examiner*—Michelle R. Connelly-Cushwa
(74) *Attorney, Agent, or Firm*—Volentine Francos, PLLC

(57) ABSTRACT

Optical fiber structures having at least two cores, whether unitary or separable, may be fabricated by controlling the placement of the cores prior to final processing to make the multi-core fiber structure. When the fiber is to be separable, at least two performs are attached, and the attachment height between adjacent canes is controlled to allow separation to be realized (or attachment to be maintained there between) anywhere along the separable multi-core fiber. These canes are then drawn together to form a desired composite fiber, either or both ends of which may be separated to allow for individual manipulation of fiber ends. The separable multi-core fiber may be utilized to fabricate a dual-port or multi-port optical component in which an input and an output (or multiple input/output) fibers are attached to the component, and the exposed distal ends of the separable multi-core fiber are thereafter separated from one another (even after the entire device is assembled and packaged) to provide separated waveguides for pigtailing or splicing to input or output fibers (or other planar or micro-optic components).

9 Claims, 5 Drawing Sheets

U.S. PATENT DOCUMENTS

| | | | |
|---|---|---|---|
| 4,188,088 A | 2/1980 | Anderson et al. | 350/96.23 |
| 4,227,771 A | 10/1980 | Nolan | 350/96.33 |
| 4,553,995 A | 11/1985 | Chigusa | 65/4.2 |
| 4,615,583 A | 10/1986 | Tsuno et al. | 350/96.33 |
| 4,630,889 A | 12/1986 | Hicks, Jr. | 350/96.3 |
| 4,653,852 A | 3/1987 | Suzuki et al. | 350/96.33 |
| 4,822,133 A | 4/1989 | Peacock | 350/96.23 |
| 4,828,349 A * | 5/1989 | Nakasuji | 385/126 |
| 5,039,195 A * | 8/1991 | Jenkins et al. | 174/70 R |
| 5,136,683 A | 8/1992 | Aoki et al. | 385/141 |
| 5,313,539 A | 5/1994 | Ogawa et al. | 385/76 |
| 5,333,229 A | 7/1994 | Sayegh | 385/102 |
| 5,408,556 A | 4/1995 | Wong | 385/48 |
| 5,524,166 A | 6/1996 | Osaka et al. | 385/134 |
| 5,530,782 A | 6/1996 | Osaka et al. | 385/45 |
| 5,602,953 A | 2/1997 | Delage et al. | 385/101 |
| 5,751,879 A * | 5/1998 | Graham et al. | 174/107 |
| 5,904,883 A | 5/1999 | Hattori et al. | 264/1.27 |
| 5,944,867 A | 8/1999 | Chesnoy et al. | 65/408 |
| 6,154,594 A * | 11/2000 | Fiacco et al. | 385/126 |
| 6,185,352 B1 * | 2/2001 | Hurley | 385/114 |
| 6,295,401 B1 * | 9/2001 | Rutterman et al. | 385/109 |
| 6,363,192 B1 * | 3/2002 | Spooner | 174/115 |

* cited by examiner

METHOD FOR MAKING SEPARABLE MULTIPLE CORE OPTICAL FIBERS, THE RESULTING FIBER STRUCTURES, AND USES THEREOF

CROSS-REFERENCE TO RELATED APPLICATION

The present application claims priority under 35 U.S.C. §119(e) to Provisional Application Serial No. 60/226,747 entitled "Method for Making Separable Multiple Core Optical Fibers, the Resulting Fiber Structures, and Uses Thereof" filed Aug. 21, 2000, the entire contents of which are hereby incorporated by reference for all purposes.

BACKGROUND OF THE INVENTION

1. Field of the Invention

The present invention relates generally to optical fiber structures having multiple cores, and particularly to a method for creating optical fiber structures with separable cores, the multi-core structures formed thereby, and uses for such separable multi-core structures.

2. Technical Background

Many applications for optical devices and components, particularly those used in telecommunications (such as Mach-Zehnder interferometers, couplers, and cascaded multi-port add/drop multiplexers), require the use of multiple fibers in which closely-spaced fiber cores are arranged in a variety of configurations. However, these fibers cannot be easily interconnected with other optical fibers or components which require pigtailing or splicing to the fibers. One solution has been to create optical fibers having multiple cores (multi-core fibers) from individual fibers by fusing these individual fibers together. However, this solution mitigates against efficient production of components, can have a detrimental effect on the individual fibers or cores in the areas or interfaces where the fibers are fused, and require greater design work and experimentation to accommodate the impact which fusing the fibers will have on the optical properties of the resulting component.

Using a plurality of separate fibers to achieve the desired interconnects typically involves employing a V-groove or other alignment structure to align the individual fibers with opposing fibers, collimating lenses, or waveguides on an integrated optical (or "planar") component. These substrates and alignment structures are expensive and difficult to fabricate and assemble with the necessary optical alignment tolerances (on the order of 0.1 micron), and often do not align the fibers with high precision when a large number of fibers are involved.

The configuration of the cores in multiple core optical fiber ribbons or bundles are typically dictated by several factors such as the availability and suitability of fiber draw equipment and processes, as well as the optical components with which the optical fibers are to be coupled and the ferrules to be used for receiving and securing the optical fibers.

SUMMARY OF THE INVENTION

The present invention is therefore directed to a separable multi-core optical fiber structure, and a method of making such fibers, which substantially overcomes one or more of the limitations and disadvantages of the related art.

The present invention provides an optical fiber having multiple cores which allows simple and precise interconnections to both a planar and fiber structures which require pigtailing or splicing. The present invention also provides a method for efficiently making such a multi-core fiber and separating the multiple-cores from one another for pigtailing or splicing to other fibers (such as input and output fibers in a multi-fiber or multi-port device). The present invention also permits effective control over the spacing between the adjacent cores in the multi-core optical fiber structure.

The present invention may be realized by providing a separable multi-core fiber structure including a plurality of fibers attached together with an attachment height between adjacent fibers small enough to allow fibers to be separated at at least one point along structure, and large enough to maintain a multi-core fiber along the remainder of the structure.

The separable multi-core fiber structure may include a spacer formed between outer fibers and fibers adjacent to the outer fibers. In one embodiment, the spacer may be fashioned as a dummy rod between each of the outer canes and adjacent canes, with the outer canes having a larger diameter than the inner canes. Alternately, the separable multi-core fiber structure may include dummy fibers adjacent to each outer fiber.

The method of the present invention for making an optical fiber structure having multiple cores includes tacking a plurality of canes together to form a tacked preform assembly, and consolidating and drawing the tacked preform assembly to desired dimensions while controlling the attachment height between canes to form the fiber structure.

The method of the present invention for using the separable multi-core optical fiber structures may include separating individual fiber cores at one end of the fiber structure after consolidating and drawing. In one embodiment, the separating process may include etching between the adjacent fibers to be separated. Alternately, the separating process may involve separating fibers at both ends of the fiber structure with the fibers remaining attached at some intermediate point of the fiber structure, or separating the fibers along substantially the entire length of the fiber structure while retaining one end of the fiber structure intact.

These advantages and uses of the present invention will become more readily apparent from the detailed description given hereinafter, taken together with the appended drawing Figures. However, it should be understood that the detailed description and specific examples, while indicating the generally preferred embodiments of the invention, are given by way of illustration only, since various changes, modifications, variations, and alterations within the spirit and scope of the invention will become apparent to those skilled in the art from this detailed description.

BRIEF DESCRIPTION OF THE DRAWINGS

The present will be described in further detail with reference to the appended drawings, in which.

DETAILED DESCRIPTION OF THE PREFERRED EMBODIMENTS

As used herein, the term "cane" is to mean macroscopic cores within claddings which are drawn into a fiber. The term "dummy rod" is to mean a macroscopic rod which is drawn into a "dummy fiber" which is not to function as a waveguide in the final separable multi-core fiber. The dummy rod and dummy fiber may have cores or other structures, or may be of a single material, such as silica.

Figure 1A:
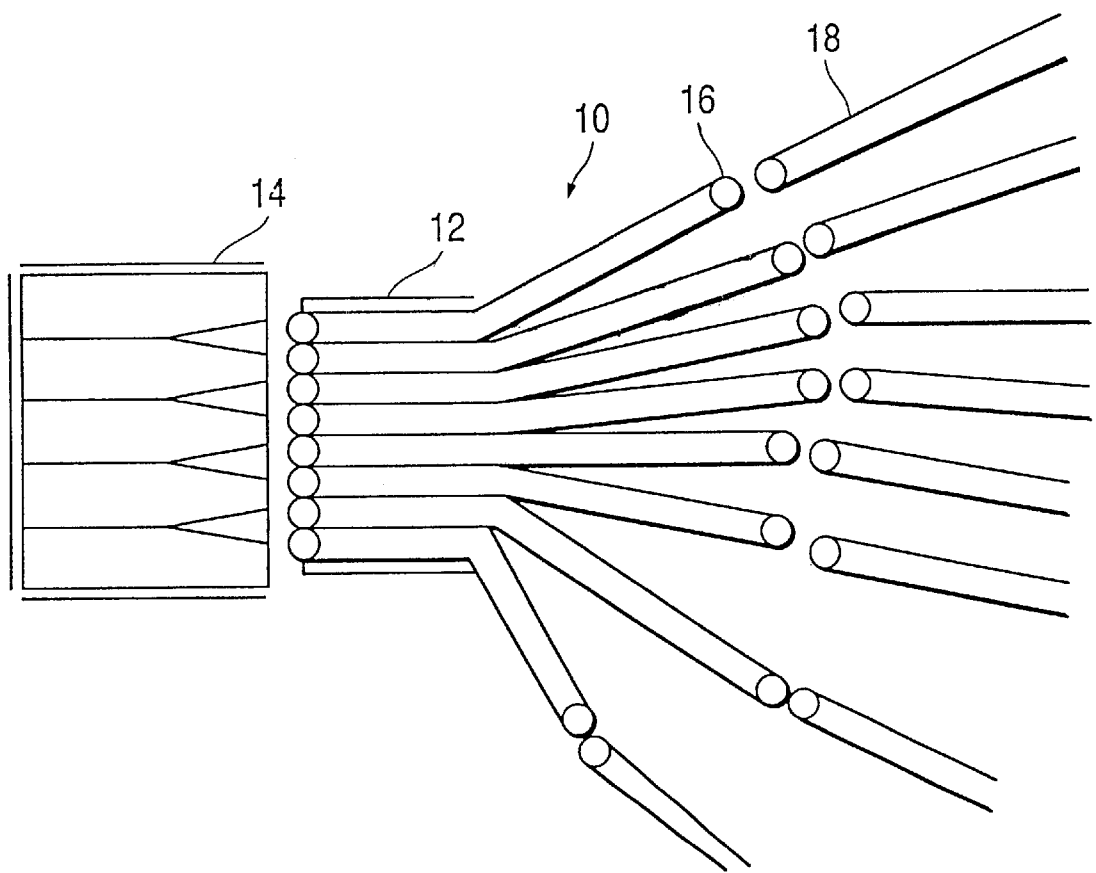
FIG. 1a is a schematic side view of a multi-core, separable fiber attached at one end to a planar device and is pigtailed at the other end.

FIG. 1A illustrates the use of a separable multi-core fiber of the present invention to connect easily to different types of devices. As shown therein, a separable multi-core fiber 10 of the present invention is connected at a multi-core end 12 to a planar device 14 and at a separable end 16 it is pigtailed to another device 18, here shown as requiring all of the cores to be separated from one another.

Figure 1B:
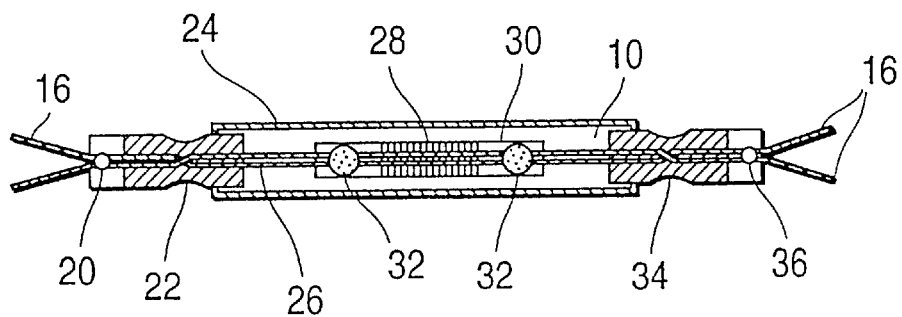
FIG. 1b is a schematic side view of a Mach-Zehnder grating using a separable multi-core fiber.

While the separable multi-core fiber is shown in FIG. 1A is completely separated at one end and completely joined at the other end, any desired configuration may be realized depending upon desired performance, e.g., the device to be connected. The separable multi-core fiber also allows new ways to add and drop channels. Further, the separable multi-core fiber is also useful for providing figure eight configurations, such as used in Mach-Zehnder interferometers, as shown in FIG. 1B. In FIG. 1B, separated ends 16 of the multi-core, separable fiber 10 are attached with epoxy 20, pass through a multiclad coupler 22 and enters an encapsulating tube 24. The dual core fiber 26 is attached to a substrate 30 having gratings 28 thereon via frit attachments 32. The dual core fiber 26 then passes through another multiclad coupler 34 and then separated back into the separate fibers 16. The stability of the dual core structure is enhanced by providing epoxy to clearly define the region between the dual core and the separated cores.

In order to efficiently produce such a separable multi-core fiber, optical canes are joined in a controlled manner such that they stay together during draw. This joining is also controlled to provide a desired attachment height in accordance with an end application thereof. The attachment height is sufficient to maintain a multi-core fiber along the resultant structure, while small enough to allow easy separation of one or more fibers at a desired portion of the structure, whether at either end, somewhere in between or at one or more portions of the structure.

First, optical fiber canes are drawn through a redraw tower to reduce the diameter variation between the canes to within a desired tolerance. These canes with reduced diameter variation are then tacked together, illustratively at a top end thereof, to form a tack which is strong enough to allow the canes to remain joined after being cooled through whatever processes are to be performed or what conditions the structure is to be subjected to. This tacking at the ends for handling may be realized by at least one of the following processes: (1) laying the canes together then placing a thin, short rod, e.g., a silica rod approximately 1 mm thick and 1 inch long, between the canes, and heating these rods to form a strong tack, i.e., strong enough to allow simultaneous draw of the canes; (2) clamping cores together and flame torch touching tangent portions together in a conventional manner; and/or (3) depositing soot on the individual preforms or in combination with any of the above steps, to facilitate easy joining of cores at temperature great enough for the soot to consolidate, e.g., in a consolidation furnace, and/or easier etching of fibers apart, due to the increased etch rate of the soot material, i.e., the soot material has a higher etch rate than the rod material. After being drawn, the resultant fibers are tacked all the way along the fibers.

The laying of the canes together is very simple, although this process may be less precise than the other processes. The clamping and flame torching is slightly more complex, but offers more precise control. The soot deposition creates a very strong bond between the canes, so it may be less desirable when creating separable multiple core fibers. Also, there may be some soot remaining between the canes, which may give rise to an undesired index variation there between.

Once these canes are joined at the ends thereof to form a tacked perform assembly, a number of processing routes can result in the final fiber: (1) placing the tacked preform assembly in a jacketing tube of any desired shape and drawn into desired dimensions under vacuum in a conventional manner; (2) placing the tacked preform assembly in a jacketing tube of any desired shape and collapsing the tube with a torch on a lathe in a conventional manner, the assembly may be placed in an etching solution to reduce the contact between the canes, the assembly is drawn to the final fiber; (3) depositing a thin layer of soot on the assembly and placing the assembly into a furnace, the soot either provides a jacket or an applied pressure to increase the bulk viscous flow rate; (4) heating the assembly to form a neck between the canes, resulting in a chemical potential gradient and transport of material from the concave to the convex surface reduces the total surface free energy, the dominant sintering mechanism being surface diffusion, thus no densification or movement of the cores occurs, achieved uniformly by lowering the assembly into a consolidation furnace, thereby creating a sintering front as the material crosses the heat zone, with temperature and downdrive determining the amount of connection between canes; and/or 5) forming a neck using a large heat zone furnace at the draw tower, allowing sintering to occur above the draw root, eliminating the need for the consolidation furnace, again with temperature and downdrive determining the attachment height.

Figure 2A:
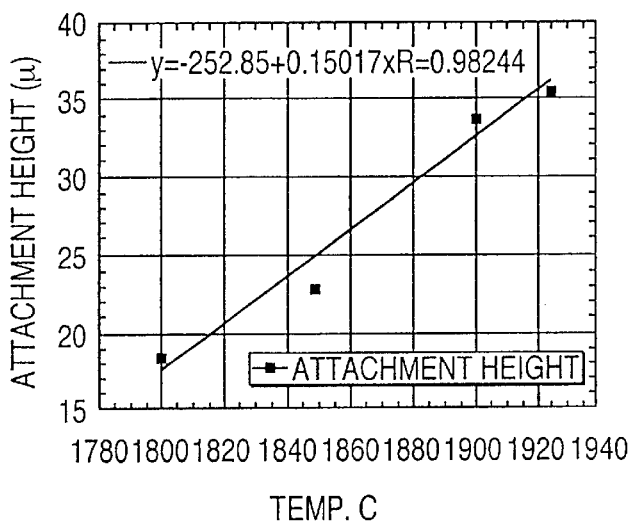
FIG. 2a is a plot of temperature versus attachment height for one of the processes of the present invention.

A graph illustrating the relationship between the temperature of the draw furnace and the attachment height is shown in FIG. 2A. The attachment height depends on the temperature, tension and speed of the draw. The draws of FIG. 2A were performed at the same speed and tension. The resultant attachment height may be controlled in any of the above processes varying any or all of these factors.

Figure 2B:
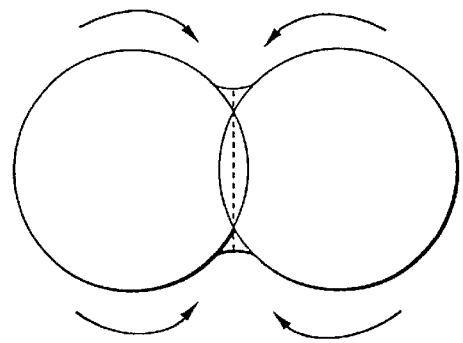
FIG. 2b is a schematic cross-section of neck growth in a two sphere model.

FIG. 2B is a schematic illustration of neck growth for a two sphere sintering model. The arrows in FIG. 2B follow the paths of the material transport. From the shape of the assembly, a chemical potential gradient exists, and the transport of material from the convex surface to the concave surface reduces the total surface free energy. The dominant sintering mechanism is surface diffusion, rather than lattice diffusion. Thus, as the neck forms, the attachment height increases and the cores move closer together, but the cores do not change shape. For two spheres of uniform diameter a, the change in the width of the assembly $\Delta w/w_0$ is given by the classic Frenkel equation as follows:

$$\frac{\Delta w}{w_o} = \frac{3\gamma_s t}{2\eta(T)a}$$

where t is the isothermal sintering time, $\gamma_s$ is the surface tension and $\eta(T)$ is the viscosity at a given temperature T.

At viscosities near the softening point, gravity-induced viscous flow can lead to assembly deformation. However, if the viscosity is too high, the canes will not join even after an extended period of time, e.g., several hours. Therefore, the temperature T needs to be set in order to achieve viscosities which are high enough to avoid deformation, but low enough to allow joining. For example, sufficient joining for silica blanks may be obtained by sintering at 1510° C., which results in a viscosity of approximately $10^9$ Poise. This temperature may be achieved in a uniform manner by lowering the assembly into a consolidation furnace at a rate of 3–10 mm/min, creating a sintering front as the assembly enters the heat zone. At above $10^{10}$ Poise, these blanks would not join even after six hours.

Figure 3A:
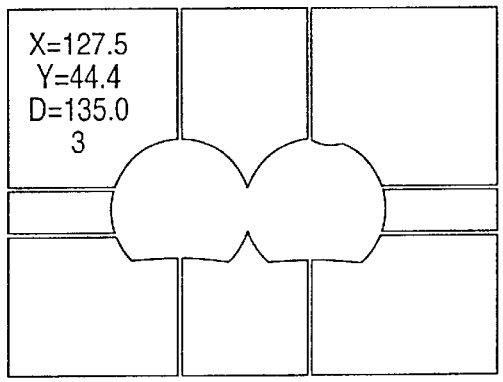
FIG. 3a is an illustration of a picture of an end of a separable core fiber with two cores made using one process of the present invention.
Figure 3B:
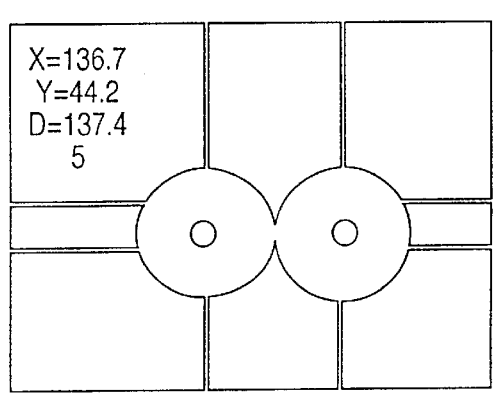
FIG. 3b is an illustration of a picture of an end of a separable core fiber with two cores made using other process of the present invention.

Examples of two different separable core fibers having different attachment heights are shown in FIGS. 3a and 3b. The assembly in FIG. 3a was made by forming a neck using a consolidation furnace, the temperature of the consolidation furnace being 1510° C., and the assembly being lowered into the consolidation furnace at a rate of 5.8 mm/min. The assembly having the neck formed therein is then taken to a draw tower with a temperature of 2125° C. with the draw rate being 3 m/sec. The attachment height in FIG. 3a is approximately 40 microns. The assembly in FIG. 3b was made by forming a neck using a large heat zone furnace at the draw tower with a draw rate of 3 m/sec and the temperature of the furnace being 1800° C. The attachment height in FIG. 3b is approximately 14 microns. While for separation of the fibers, it is desirable to have the attachment height as thin as possible while maintaining the multi-core configuration, for some applications, it may be desirable to have an attachment height which is larger than practical limits. For example, some applications may require larger attachment heights for strength reasons, while other applications may want some interaction between the cores.

Using the above processes, continuous length, separable multi-core fibers may be made at lengths of upward of hundred of kilometers. Once the multi-core, separable fiber has been created by any combination of the above processes, one or more fibers may be separated at any point along any desired length of the fiber. This separation allows, for example, design flexibility, adaptability, and ease of connection with certain devices. This separation may be realized mechanically, chemically or thermally in known manners. For example the structure may be exposed to ammonium bifluoride which chemically etches fibers to separate the cores. Since the attachment height is smaller than the fibers, this attachment height will be etched through before affecting the fiber structure. Alternatively, the fibers may be protected and only the attachment height is exposed to the etchant. As noted above regarding the applications of the separable multi-core fiber, either end or any desired point may have no separation, all separation, or selective separation, i.e., of any subset of the fibers, depending upon a desired end use.

Figure 4A:
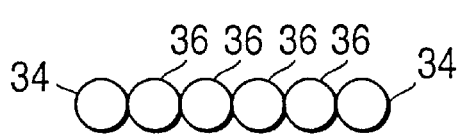
FIGS. 4a–4c are sketches of different fiber arrangements in accordance with the present invention.
Figure 4B:
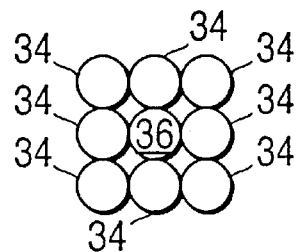
Figure 4C:
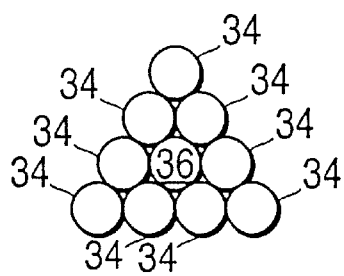

When forming multiple core structures with more than two canes in any direction such that there are outer canes 34 and middle or inner cane(s) 36, these two groups of canes experience different conditions during processing. Examples of such configurations are shown in FIGS. 4a–4c. This can result in the cores at the resultant outer fibers not being correctly positioned relative to the cores of the inner fibers. This is a problem, for example, when a multi-core end is to be planarly aligned. Examples of desired spacing between cores include 10–200 μm, 100–150 μm, 120–130 μm.

A furnace with a high aspect ratio at the draw tower can be used to minimize the thermal gradient between the inner and outer canes of the assembly. Since every core appears to be the same distance away from the wall, the temperature appears the same to all cores. Even with this minimizing of the thermal gradient, the outer canes will experience the fusion process at only one side thereof, while the inner canes will be pulled from both directions. Thus, cores of the outer fibers will be closer to the cores of the adjacent fibers, resulting in the above noted misalignment of the cores of the outer fibers.

Figure 5A:
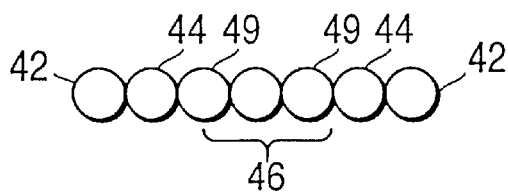
FIGS. 5a–5c illustrate different embodiments for controlling the core spacing in accordance with the present invention.

As shown in FIG. 5a, a first solution to this problem involves the use of at least one dummy rod 42 adjacent to an exposed edge of each outer cane 44. The provision of these dummy rods will make the outer canes 44 experience the fusion process in the same manner as the inner canes 46, i.e., the outer canes 44 will now be pulled in both directions. More than one dummy rod 42 may be used adjacent to each outer cane 44 in order to even more closely approximate the conditions of the central canes 48, including compensating for any deviations at the inner canes 49 adjacent to the outer canes 44.

Figure 5B:
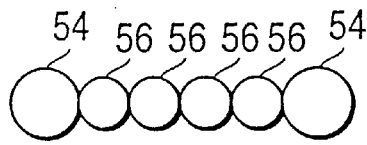

Another solution is shown in FIG. 5b. Here, the outer canes 54 are made with a same core size as the inner canes 56, but with a larger diameter. While the outer canes 54 will still only experience pulling from one side during the fusion process, the larger diameter of the outer canes 54 results in the desired core spacing between the core of the outer fiber and the core of an adjacent fiber.

Figure 5C:
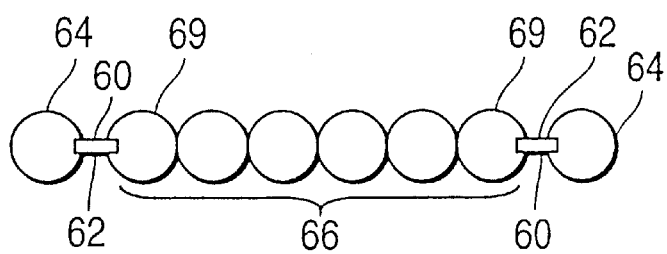

Still another solution is shown in FIG. 5c. Here, slots 60 are cut into outer canes 64 and inner canes 69 adjacent to the outer canes 54. A spacer 62, preferably of a material having similar thermal characteristics as the canes, such as silica, is inserted into these slots 60. The slots 60 should be deep enough to ensure firm hold of the end canes while being far enough away from the light carrying regions such that the performance thereof is not affected. Of course, other configurations providing spacing between the outer cane 64 and the adjacent cane 69 could be employed, such as using thicker adhesive between these canes for the joining.

Figure 6:
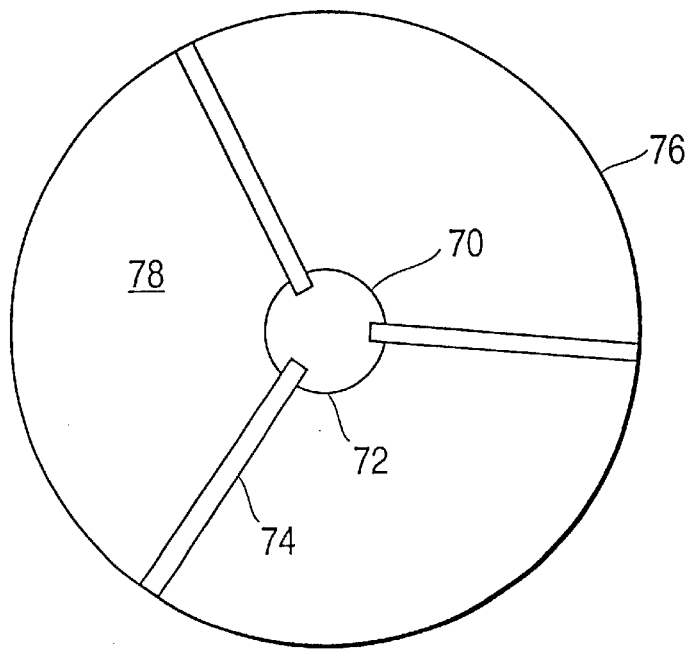
FIG. 6 illustrates another embodiment employing the slot and spacer configuration FIG. 5c.

Another structure employing the slot and spacer configuration of FIG. 5c is shown in FIG. 6, in which a core cane 70 has at least one slot 72 formed therein. A spacer or strut 74 is provided in each slot 72, with free ends of the spacer 74 are in contact with a jacket 76. The jacket 76 may include features for receiving the spacer 74. The spacers 74 center and suspend the core cane 70 in the jacket 76. The connection between the core cane 70 and the spacers 74 should be as thin as possible in order to maximize the contrast between the effective indices of the core cane 70 and the cladding 78, which is typically air. Thus, a high air filling fraction clad fiber may be used to substitute for a photonic crystal fiber, and is easier to manufacture than the photonic crystal fiber.

Figure 7:
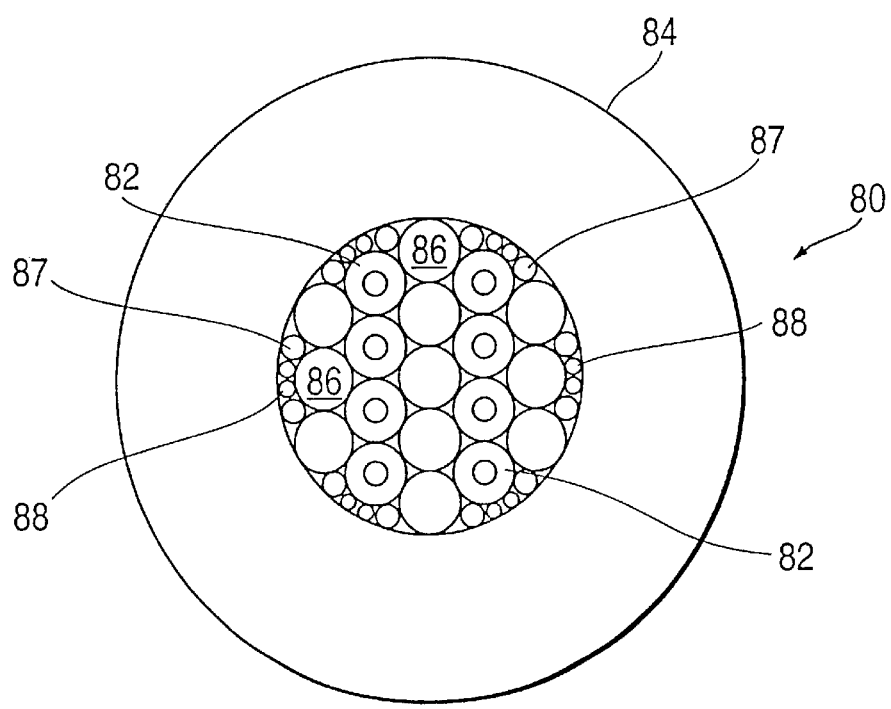
FIG. 7 is an end view of a multiple core fiber of the present invention.

While the above manufacturing steps have been discussed regarding separable multi-core fibers, the manufacturing method of the present invention may also be used to create multiple core fibers in which the ends are not to be separated. As shown in an end view of FIG. 7, a multiple core fiber 80 includes active core/clad canes 82 which are surrounded and positioned in a conventional fiber housing 84 with varying sized dummy rods 86–88 to fix the active core/clad canes in the fiber housing 84. The assembly in the housing may then be consolidated and drawn as set forth above. This allows any cross-section, such as a ribbon cross-section shown in FIG. 7, to be realized while allowing standard connectors to be used to attach the multiple core fiber to other devices. Examples of such cross-sections are shown in U.S. Pat. No. 6,154,594, entitled "Multicore Glass Optical Fiber and Methods of Manufacturing Such Fibers", which is hereby incorporated by reference in its entirety.

Figure 8:
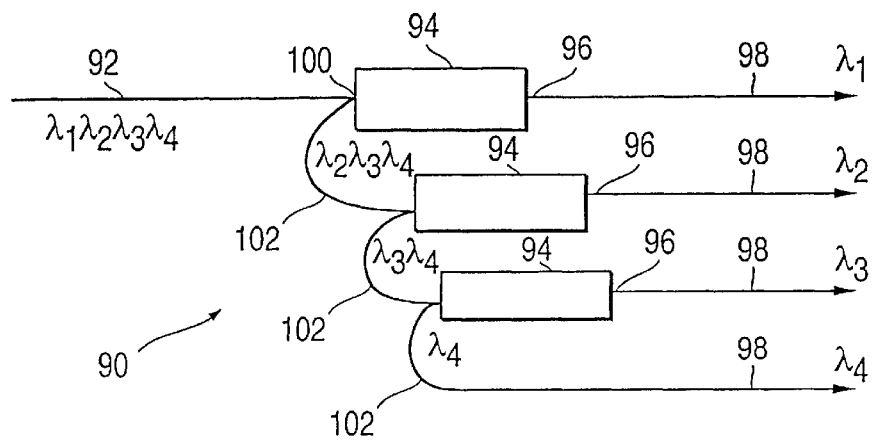
FIG. 8 is a diagram of an multi-channel wavelength division multiplexer or demultiplexer (WDM) employing a plurality of cascaded three-port optical components to separate or combine discrete wavelength channels.
Figure 9:
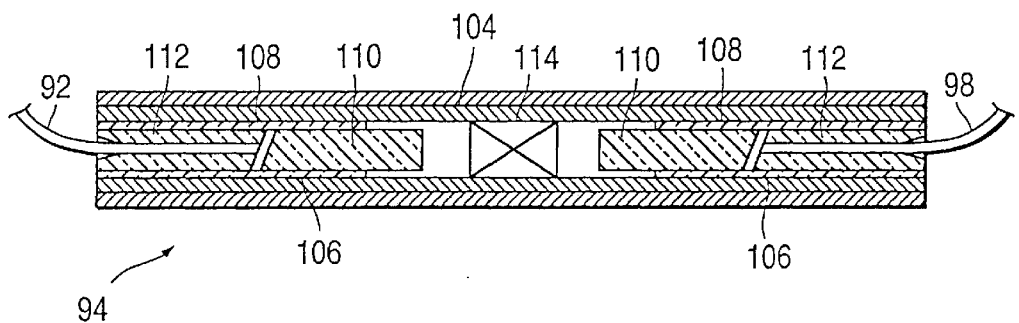
FIG. 9 is a cross-sectional view of one three-port optical component of the type utilized in the WDM of FIG. 8.
Figure 10:
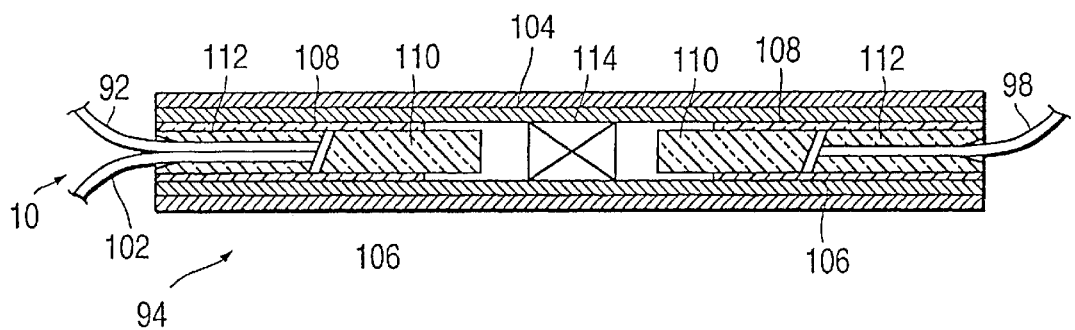
FIG. 10 is a cross-sectional view of the three-port optical component of FIG. 9 wherein the multi-port connection has been achieved utilizing a separable multi-core optical fiber of the present invention.

One particular representative and exemplary application for the separable multi-core optical fiber 10 of the present invention is further illustrated in FIGS. 8–10. Referring particularly to FIG. 8, a multi-channel or N-channel optical wavelength division multiplexer and/or demultiplexer (WDM) 90 is shown. The WDM 90 is described herein as a demultiplexer separating out incoming wavelengths of light, but is well known in the art to operate as a multiplexer when the paths traversed by the optical signals are reversed. In FIG. 8, a plurality of discrete wavelengths or channels $\lambda_1$, $\lambda_2$, $\lambda_3$, $\lambda_4$, of an incoming optical signal are transmitted along an input fiber 92 or waveguide to a first optical component 94 (sometimes referred to in the art as a coupler or splitter, but herein referred to as a thin-film filter device). The thin film filter device may be a wavelength-selective filter element selected from a group consisting of a narrow-band filter, a broadband filter, a highpass filter, or a lowpass filter.

The first optical component separates out one discrete wavelength or channel $\lambda_1$ from the plurality of N channels, either transmitting or reflecting that single channel to a first output port 96 and an associated output fiber 98, with the remaining wavelengths or channels $\lambda_2$, $\lambda_3$, $\lambda_4$, conversely all being reflected or transmitted to a second output port 100 and associated output fiber 102, where they are sequentially transmitted to and processed by downstream optical components 94 each tuned to the corresponding wavelength or channel $\lambda_2$, $\lambda_3$, $\lambda_4$ to be dropped or separated. In the parallel cascaded three-port WDM 90 architecture shown in FIG. 8, the individual signal channels or wavelengths which are separated out are done so by transmitting that wavelength of channel through the optical component 94 to the first output port 96 and output fiber 98, whereas all the remaining channels or wavelengths are reflected to the second output port 100 and output fiber 102. In a serial architecture (not shown), individual channels would be separated by reflection to the second output port 100 by each optical component 94, with remaining channels being transmitted to the first output port 96.

Referring to FIG. 9, a typical three-port optical component 94 is disposed within a generally cylindrical housing 104, and includes a pair of collimator assemblies 106 each having a collimator tube 108 supporting a collimating lens 110 such as a gradient index (GRIN) lens, a fiber ferrule 112 defining a fiber-receiving bore, and one or more input or output fiber 92, 98 received therein. The combination of a ferrule 112, lens 110, collimator tube 108, and one input or output fiber 92, 98, 102 forms a single port, with a multi-fiber collimator assembly 106 containing two or more fibers 92, 98 forming multiple ports. A filter 114 is disposed between spaced-apart collimator assemblies to transmit or reflect predetermined wavelengths or channels of the optical signal traversing the particular optical component 94.

Referring to FIG. 10, the multi-port or dual-port collimator assembly 106 of the optical component 94 is shown fabricated using the separable multi-core optical fiber 10 of the present invention to define both the input fiber 92 and the first output fiber 102 and associated input port and second output port. The optical component 94 (or at least the associated dual-port collimator assembly 106) is assembled with the separable multi-core optical fiber 10 being inserted into the ferrule 112 prior to separating the multiple cores from one another, with the adjacent cores then being separated only after the separable multi-core optical fiber 10 is secured within the ferrule 112 (or even after the entire optical component 94 is fabricated and packaged) and prior to pigtailing or splicing the input fiber 92 and the second output fiber 102 to the separated segments of the separable multi-core optical fiber 10. While a dual-port or two-fiber embodiment has been shown and discussed by way of example, it will be readily appreciated that devices having collimator assemblies or ports in excess of two input/output fibers may similarly be fabricated.

As a practical example, the fiber structure in FIG. 10 may include a first waveguide core is connected to a second waveguide core at the distal end by a bridge portion, and wherein the first waveguide core is spaced from the second waveguide core a distance of less than or approximately equal to 125 microns at the proximal end. The physical separation to realize the configuration in FIG. 10 then includes disconnecting the bridge portion between the first waveguide core and the second waveguide core adjacent the distal end and moving the first waveguide core away from the second waveguide core a distance of not less than one millimeter measuring at the distal end. As a further example, the first waveguide core is moved away from the second waveguide core by not less than five millimeters or not less than one centimeter.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A separable multi-core optical fiber structure, comprising:

a plurality of fused optical fibers, the plurality of fused optical fibers defining an attachment height between adjacent fused optical fibers that is small enough to allow adjacent fused optical fibers to be separated into individual optical fibers at a desired point, and that is large enough to maintain a multi-core optical fiber at other points of the separable multi-core fiber structure, wherein each of said fused optical fibers at said other points share a common single cladding layer formed by fusing respective cladding layers of individual optical fibers.

2. The separable multi-core fiber structure of claim 1 further comprising:

a spacer between outer fibers and fibers adjacent to the outer fibers.

3. The separable multi-core fiber structure of claim 2 wherein the plurality of fibers include outer fibers and inner fibers, and wherein the spacer comprises:

a dummy fiber disposed between each of the outer fibers and the adjacent fibers.

4. The separable multi-core fiber structure of claim 1 wherein the plurality of fibers include outer fibers and inner fibers, the separable multi-core fiber structure further comprising:

a dummy fiber adjacent to each outer fiber.

5. The separable multi-core fiber structure of claim 1, wherein adjacent cores of the separable multi-core fiber structure are evenly spaced.

6. The separable multi-core fiber structure of claim 1, wherein spacing of adjacent cores is 10–200 $\mu$m.

7. The separable multi-core fiber structure of claim 6, wherein spacing of adjacent cores is 100–150 $\mu$m.

8. The separable multi-core fiber structure of claim 7, wherein spacing of adjacent cores is 120–130 $\mu$m.

9. A separable multi-core fiber structure, comprising:

a plurality of fibers, the plurality of fibers defining an attachment height between adjacent fibers that is small enough to allow adjacent fibers to be separated into individual fibers at a desired point, and that is large enough to maintain a multi-core fiber at other points of the separable multi-core fiber structure; and the plurality of optical fibers include inner fibers and outer fibers, wherein the outer fibers are formed from canes having a larger outer diameter than canes which are used to form the inner fibers.

* * * * *